Jan. 4, 1927.
H. C. CHILCOAT
1,613,085
DRAFT EQUALIZER
Filed June 1, 1926
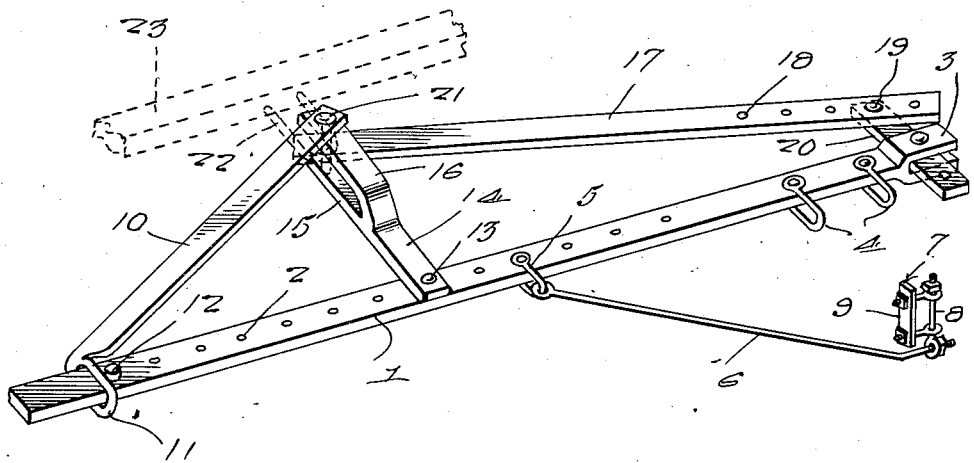
Inventor
H. C. Chilcoat
By Clarence A. O'Brien
Attorney Patented Jan. 4, 1927.

1,613,085

UNITED STATES PATENT OFFICE.

HARVEY C. CHILCOAT, OF STANTON, NEBRASKA.

DRAFT EQUALIZER.

Application filed June 1, 1926. Serial No. 112,983.

This invention relates to an improved draft equalizer of the type employed for proportioning the load and tractive effect of a plurality of draft animals, whereby the power of a team of five horses abreast may be evenly distributed and equalized for obtaining efficient results.

My main object is, of course, to provide a structure of this kind wherein the leverage is so arranged as to permit the load to be distributed in proper proportion so that four of the horses will be permitted to walk upon the unplowed land and the remaining horse permitted to walk in the furrow, each horse being compelled to contribute its appointed share.

Other objects and advantages are simplicity in construction, inexpensiveness of manufacture, and ease and facility of connection of the structure with a gang-plow.

In the accompanying drawing:—

The figure represents a perspective view of a draft equalizer constructed in accordance with this invention.

By referring to the drawing in detail, it will be seen that the reference character 1 designates the main bar which is provided with a plurality of adjustment holes 2 at longitudinally spaced points and is provided at one end with a fork coupling 3. Adjacent this fork are plow attaching clevises 4 and at the approximate center of the bar is an additional clevis 5. Swingably connected with this clevis 5 is a truss rod 6 provided at its rear end with a special coupling 7 for the plow beam (not shown). The coupling is here shown as composed of a relatively long eye bolt 8 and a pair of short eye bolts connected thereto and to a flat connecting plate 9. This provides a very convenient connection for the plow beam. At the left hand end of the main draw bar is a relatively short link 10 having a loop 11 adjustably mounted upon the draw bar 1 and held in place by a removable pin or stud 12. At the center of the draw bar and pivotally connected thereto as at 13 is a connecting member 14 terminating in spaced arms 15 and 16. Disposed in divergent relation to the link 10 is a relatively long link 17 provided at its rear end with adjusting holes 18 for passage of a pin 19 which extends through an opening in a joining element 20. This element 20 is also pinned between the arms of the aforesaid fork 3. The opposite end of the link 17 is arranged between the arms 15 and 16 and a king pin 21 passes through the link 10, arm 16, link 17, and arm 15. In addition, this pin 21 passes through the U-shaped draft connector 22 carried by the draft bar 23.

It is believed to be unnecessary to attempt to actually trace the distribution of the strain and stresses through the mechanism described. It may be stated, however with due accuracy that in actual practice this specific construction and arrangement of parts serves to evenly distribute the weight, and proportions the power of the multiplicity of draft animals which are connected, as before stated in a row of four to travel on the solid ground and the remaining one to travel in the furrow. However, the effect may be changed by adjusting the mechanism and the adjustment can only be ascertained by careful experimentation. It is believed therefore, that a clear understanding of the invention will now be had, and for this reason a more lengthy description need not be entered.

Having thus described the invention, what I claim as new and desire to secure by Letters Patent is:—

In a structure of the class described, a main draft bar provided with a multiplicity of apertures, plow connecting means on said bar, a fork at one end of the bar, a forked connecting member adjustably connected with the central portion of the bar, a relatively short link provided with a loop slidably connected with one end portion of the bar, a relatively long link, said links being connected with the forked end of the connecting member, and a connection between the outer end of the long link and the forked end of the draft bar.

In testimony whereof I affix my signature.

HARVEY C. CHILCOAT.